Feb. 5, 1957  M. T. DUGGAN  2,780,257
SCREW HOLDING AND GUIDING MEANS FOR A SCREWDRIVER BIT
Filed Dec. 14, 1953
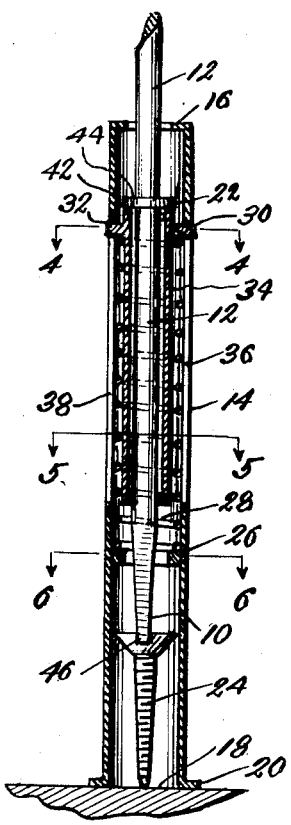
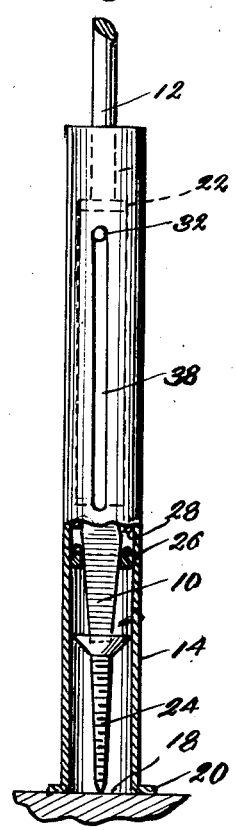
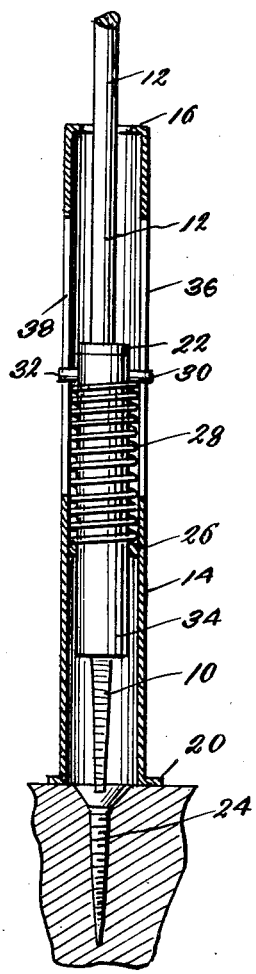
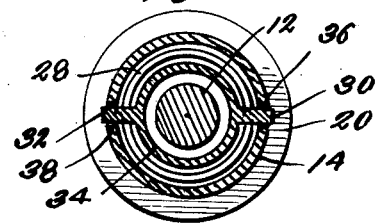
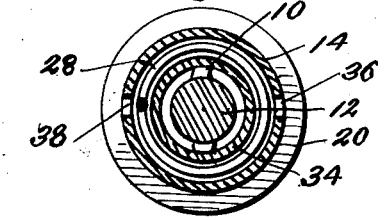
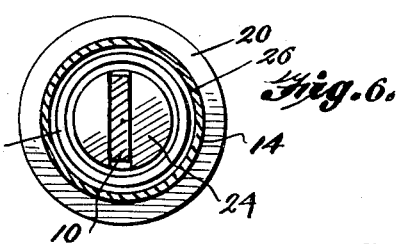
INVENTOR.
MORGAN T. DUGGAN
BY
Patrick D Beavers
ATTORNEY

United States Patent Office 2,780,257
Patented Feb. 5, 1957

2,780,257
SCREW HOLDING AND GUIDING MEANS FOR A SCREWDRIVER BIT

Morgan T. Duggan, South Windsor, Conn.

Application December 14, 1953, Serial No. 397,936

1 Claim. (Cl. 145—51)

This invention appertains to improvements in screw drivers and particularly relates to improvements in the construction and mounting of screw driver bits.

A primary object of this invention is to provide a holder within which the bit of a screw driver, of any type, is axially and rotatably movable, the holder serving to hold a screw to locate the bit in the kerf of the screw, to position the screw properly on a workpiece and hold it in the work piece as it is being advanced therein to by the bit.

A further object of this invention is to provide a guide means for a screw driver bit, which completely encloses the bit concentrically thereof, and retains a screw in engagement with the bit and in position for advancement into a work piece.

Another object of this invention is to provide a simple accessory for a screw driver which will hold a screw preparatory to advancement of the screw into a work piece and irrespective of the position or plane of the work piece.

These and ancillary objects and structural features of merit are attained by this invention, the preferred embodiment of which is set forth in the following description and illustrated in the accompanying drawing, wherein;

Figure 1 is a side elevational view partly in section;

Figure 2 is a longitudinal sectional view;

Figure 3 is a longitudinal sectional view, partly in elevation, and showing the parts in position after a screw has been advanced into place in a work piece;

Figure 4 is a cross sectional view taken on line 4—4 of Figure 2;

Figure 5 is a cross-sectional view taken on line 5—5 of Figure 2, and

Figure 6 is a cross sectional view taken on line 6—6 of Figure 2.

Referring more particularly to the accompanying drawing, the numeral 10 designates the bit of a screw driver (not shown) and of any mechanical or manual type. The bit is integral with a shank 12.

A tubular member 14 surrounds the shank and has an apertured closed end 16 within which the shank is rotatably and slidably disposed. The member 14 has an opposite open end 18 that is formed with a lateral flange 20 which serves as a bearing surface for the member 14. A stop 22 is formed on the shank 12 to prevent the member 14 from sliding off of the shank and to hold the flange 20 flat on a work piece, as will be described.

The member 14, inwardly from its open end 18 a suitable distance so as to enable the member to entirely receive and completely house a screw 24, is formed with an internal shoulder 26. The shoulder 26 seats one end of a coil spring 28. The other end of the spring bears against lateral arms 30 and 32, which extend radially in diametrically opposite directions from a sleeve 34. The arms 30 and 32 project through and are slidable in axial slots 36 and 38 formed in the member 14. The sleeve 34 has an open end 40 and a closed end 42, which, of course, has an aperture 44 to receive the shank 12. The stop 22 bears on the end 42 to provide the means for tensioning the spring and retaining the member 14 in position to hold the screw 24.

In use, as shown in Figures 1–3, the screw 24 is housed within the member 14 and its kerf 46 is engaged by the bit 10. The screw is held in such engagement, regardless of whether it is to be placed horizontally into a work piece or vertically thereinto.

As the shank is rotated, it moves axially and the spring is compressed to apply greater pressure to the holder to hold it in place.

Of course the shape of the bit will depend upon the shape and form of the kerf and also the distance between the end 18 and the shoulder 26 and the diameter of the member 14 will depend upon the length and diameter of the screw.

It can be seen that the screw will be held in engagement of the bit and in position to be driven thereby into a work piece.

While the best known form of my invention has been disclosed herein, other forms may be realized as come within the scope of the appended claim.

What I claim is:

In combination with a screw driver bit and shank, a screw holder comprising a tubular member concentrically disposed on the bit and shank and having an open end normally disposed outwardly longitudinally of the bit to receive and entirely house a screw, a shoulder on the inside of the member inwardly of the open end, a sleeve disposed on the shank within the member, a slide connection between the sleeve and the member said slide connection including axial slots in the member and radial arms on said sleeve received in the slots, a spring concentrically disposed between the sleeve and the member and bearing on the shoulder and the radial arms and an abutment on the shank bearing on the sleeve.

References Cited in the file of this patent

UNITED STATES PATENTS

| | | |
|---|---|---|
| 343,150 | King | June 1, 1886 |
| 486,395 | Carr | Nov. 15, 1892 |
| 701,941 | Rowlands | June 10, 1902 |
| 1,126,370 | Borresen | Jan. 26, 1915 |
| 1,539,782 | Stansell | May 26, 1925 |
| 1,593,233 | Wilson | July 20, 1926 |
| 2,276,470 | Dodelin | Mar. 17, 1942 |
| 2,565,505 | Lamb | Aug. 28, 1951 |

FOREIGN PATENTS

| | | |
|---|---|---|
| 155,844 | Switzerland | Oct. 1, 1932 |